United States Patent

Hubert et al.

[11] Patent Number: 6,162,504
[45] Date of Patent: Dec. 19, 2000

[54] ADHESIVES AND SEALANTS CONTAINING ADHESION PROMOTER COMPRISING WASTE POWDER PRIME

[75] Inventors: James F. Hubert, Brookfield, Wis.; Joseph D. Lukanich, Grays Lake, Ill.

[73] Assignee: Henkel Corporation, Gulph Mills, Pa.

[21] Appl. No.: 09/201,609

[22] Filed: Nov. 30, 1998

Related U.S. Application Data

[60] Provisional application No. 60/067,530, Dec. 4, 1997.

[51] Int. Cl.[7] ........................................................ B05D 3/02
[52] U.S. Cl. ............................................ 427/386; 523/465
[58] Field of Search .............................. 523/465; 427/386

[56] References Cited

U.S. PATENT DOCUMENTS

| | | |
|---|---|---|
| 2,702,282 | 2/1955 | Shamp . |
| 2,968,638 | 1/1961 | Meckler . |
| 3,627,707 | 12/1971 | Giessler ................................... 260/2.5 |
| 3,736,277 | 5/1973 | Bender . |
| 4,146,520 | 3/1979 | Bierwirth et al. . |
| 4,151,317 | 4/1979 | Burba et al. . |
| 4,251,426 | 2/1981 | McClure et al. ......................... 525/934 |
| 4,268,548 | 5/1981 | Burba et al. . |
| 4,303,559 | 12/1981 | Trost . |
| 4,351,914 | 9/1982 | Khanna ..................................... 523/488 |
| 4,440,900 | 4/1984 | Burba et al. . |
| 4,533,524 | 8/1985 | Burba et al. . |
| 4,540,731 | 9/1985 | Gilvary et al. . |
| 4,673,710 | 6/1987 | Burba et al. . |
| 4,851,464 | 7/1989 | Wozniak . |
| 4,900,771 | 2/1990 | Gerace et al. . |
| 4,959,399 | 9/1990 | Huynh-Tran ............................. 523/437 |
| 5,006,585 | 4/1991 | DiBella . |
| 5,032,432 | 7/1991 | Huynh-Tran . |
| 5,039,768 | 8/1991 | Gerace et al. . |
| 5,084,532 | 1/1992 | Schenkel . |
| 5,130,200 | 7/1992 | Huynh-Tran . |
| 5,143,650 | 9/1992 | Gerace et al. . |
| 5,157,079 | 10/1992 | Duck et al. . |
| 5,160,628 | 11/1992 | Gerace et al. . |
| 5,205,963 | 4/1993 | Brito et al. . |
| 5,223,106 | 6/1993 | Gerace et al. . |
| 5,229,428 | 7/1993 | Bayer ......................................... 521/73 |
| 5,254,263 | 10/1993 | Gerace ..................................... 210/667 |
| 5,604,271 | 2/1997 | Lundeen . |
| 5,710,199 | 1/1998 | Hubert et al. . |
| 5,880,218 | 3/1999 | Gerace et al. . |
| 5,922,834 | 7/1999 | Gerace et al. . |

FOREIGN PATENT DOCUMENTS

| | | |
|---|---|---|
| 0 171 850 A1 | 2/1986 | European Pat. Off. . |
| 0 344 946 A2 | 12/1989 | European Pat. Off. . |
| 57-105465 | 6/1982 | Japan . |
| 1081-190 | 3/1984 | U.S.S.R. . |
| 1700016 A1 | 12/1991 | U.S.S.R. . |

OTHER PUBLICATIONS

Lee and Neville, Handbook of Epoxy Resins, p. 21–5, 1967.

*Primary Examiner*—Robert Dawson
*Assistant Examiner*—D. Aylward
*Attorney, Agent, or Firm*—Wayne C. Jaeschke; Stephen D. Harper

[57] ABSTRACT

Waste powder prime comprising from about 30 to about 70 weight percent epoxy resin, the balance of the waste powder prime comprising filler, pigment and/or curing agent, is advantageously employed as a replacement for epoxy resins in conventional adhesion promoter systems for polymeric plastisols. The resulting compositions are useful as adhesives and sealants in industrial manufacturing processes such as in the manufacture of automobiles.

31 Claims, No Drawings

ADHESIVES AND SEALANTS CONTAINING ADHESION PROMOTER COMPRISING WASTE POWDER PRIME

This application claims priority to U.S. Provisional Application No. 60/067,530 filed on Dec. 4, 1997.

FIELD OF THE INVENTION

This invention relates to adhesives and sealants containing adhesion promoters. More particularly, this invention relates to adhesives and sealants containing adhesion promoters comprising epoxy resin-containing waste powder prime.

BACKGROUND OF THE INVENTION

Adhesives and sealants are widely employed in many industrial manufacturing processes. Adhesives are employed to bind various substrates together. Sealants are employed to produce load bearing elastic joints between two or more surfaces and to prevent the passage of air, water and dirt through the joints. The automotive industry, in particular, is a major user of adhesives and sealants. Automobiles are assembled from several structural components which are joined together in various fashions depending on the particular components and the degree of stress that will have to be endured. For certain assembly steps an adhesive composition is applied as a liquid and subsequently hardened to provide sufficient bonding strength. For example, adhesives are utilized in the assemblies of door panels, quarter panels, tailgates and roofs. These same assemblies also employ sealant compositions at a later stage in the assembly line. Still other automobile assemblies which are welded or bolted together use sealant compositions in their seams. The wheel house, shock tower, rocker panel, firewall, floor hem flange, floorpan, and trunk are a few examples of where sealants are employed.

Automotive adhesives and sealants are typically made of plastisols, i.e., dispersions of polymeric resins in plasticizers. Typical polymeric resins include poly (vinyl chloride), poly (vinyl acetate) and copolymers of vinyl chloride and vinyl acetate. Other polymers can be employed as well in the preparation of plastisols. Plasticizers are high boiling liquids which attack and plasticize the polymeric resin particles. Plastisols are liquids which are applied at room temperature to fill seams and body joints which need to be sealed. The liquid is converted to a solid through exposure to heat. In effect, the heat causes the dispersed resin particles to fuse together. A solid product results upon subsequent cooling. Plastisols can be painted over without leaching or causing other cosmetic problems. Finally, they are durable enough to withstand normal weather and user exposure. Another important quality of plastisols is that they are not expensive.

Since the adhesion of a plastisol to cold-rolled-steel or electrodeposition coatings (E-coat) is poor, conventional adhesives and sealants must contain adhesion promoters. Known adhesion promoters for adhesives and sealants include polyamidoamines, polyamines, epoxy resins, reaction products of polyamines and epoxy resins, blocked isocyanates, organofunctional silanes, mixtures of urotropine and resorcinol, and combinations thereof. The adhesion promoter typically represents from about 3 to about 15 weight percent of the entire adhesive or sealant composition. Various adhesion promoter systems are described in U.S. Pat. Nos. 4,146,520, 4,151,317, 4,268,548, 4,440,900, 4,533,524, 4,540,731 and 4,673,710.

In the manufacture of automobiles and other articles of manufacture, the bodies and frame assemblies thereof are coated, or primed, electrostatically with a 100 percent solids powder spray. The compositions of such powder sprays, referred to in the automotive industry as "powder prime", and methods of electrostatically applying the powder prime are well known to those skilled in the automotive industry. It is estimated that on the order of 25,000 pounds per month of 100 percent solids waste powder prime may be generated at each assembly plant in which it is used to prime auto parts, such as frame assemblies. That powder prime which does not remain affixed to the primed auto part and which is recovered subsequent to the electrostatic deposition of the powder prime thereon, is transported as waste to landfills for disposal.

U.S. Pat. No. 5,710,199 discloses an additive for automotive sealants which is composed of a dispersion of waste powder prime in a plasticizer. The waste powder primes disclosed in U.S. Pat. No. 5,710,199 are generated from conventional electrostatic deposition processes. Typically, these primes contain a polymeric resin, such as a polyester, a polyester/acrylic copolymer or a polyester/acrylic/polyurethane terpolymer. The plasticizer can include, e.g., 2-ethylhexyl diphenyl phosphate, diisoheptyl phthalate, a linear phthalate based on $C_7$–$C_9$ alcohols, and a mixture of esters and dipropylene glycol dibenzoate. The resulting additive is blended with a polymeric film-former such as poly(vinyl chloride), poly (vinyl acetate) or copolymers of vinyl chloride and vinyl acetate to form the automotive sealant product. The automotive sealants described in U.S. Pat. No. 5,710,199 do not require adhesion promoters in order to bond to primed surfaces and E-coat.

SUMMARY OF THE INVENTION

The instant invention is based on the discovery that waste powder prime comprising from about 30 to about 70 weight percent epoxy resin, the balance comprising filler, pigment and/or curing agent, can be advantageously employed as a total or partial replacement of epoxy resin employed in conventional adhesion promoter systems in plastisol compositions.

Accordingly, one aspect of the present invention is a composition, useful as an adhesive or sealant in an industrial manufacturing process, containing plastisol;

an adhesion promoter system comprising epoxy resin; and, one or more optional components selected from the group consisting of fillers, pigments, curing agents, wetting agents, tackifiers, rheological additives, extenders, stabilizers, water-absorbing substances, waxes, and mixtures thereof, wherein the improvement comprises replacing all or part of said epoxy resin in said adhesion promoter system with waste powder prime comprising from about 30 to about 70 weight percent epoxy resin, the balance of the waste powder prime comprising filler, pigment and/or curing agent, wherein the weight ratio of replaced epoxy resin to epoxy resin present in said waste powder prime is about 1:1.

Another aspect of the present invention is a method of making a composition, useful as an adhesive or sealant in an industrial manufacturing process, which comprises:

(a) mixing finely divided polymeric resin particles and plasticizer to provide a plastisol;

(b) adding at least one component selected from the group consisting of thermoplastic resins, fillers, pigments, curing agents, wetting agents, tackifiers, rheological additives, extenders, stabilizers, solvents, water-absorbing substances, waxes, and mixtures thereof, to the plastisol; and (c) adding an adhesion promoter system to the plastisol, said adhesion promoter system comprising waste powder prime comprising from about 30 to about 70 weight percent epoxy resin, the balance of the waste powder prime comprising filler, pigment and/or curing agent.

Yet another aspect of the present invention is a method of applying an adhesive or sealant to a substrate which comprises applying the composition of the present invention to said substrate and heating the composition and substrate at a temperature of from about 165° C. to about 200° C.

The inventors can identify at least four distinct benefits to their invention. First, since the cost of waste powder prime is approximately one-fourth the cost of standard epoxy resin adhesion promoters, the compositions of the present invention can be formulated at a significantly lower cost compared to compositions formulated without said waste powder prime. Second, the present invention provides a practical and economical solution to a significant environmental need by reducing or eliminating the amount of waste powder prime which is disposed of in landfills, without the need for extensive and expensive recycling processes. Third, waste powder prime requires no processing to remove unwanted solvent or water prior to its use in the preparation of the composition of this invention. Fourth, waste powder prime typically is free or essentially free of components such as tackifiers, plasticizers and coalescents, which commonly are used in film-forming "paints" formulated with water and/or solvents. As a result, in the formulation of the compositions of this invention, the formulator need not be concerned with detrimental effects such components might have on the particular formulated compositions.

DESCRIPTION OF THE PREFERRED EMBODIMENTS

Waste powder prime which is employed in the practice of the present invention comprises from about 30 to about 70 weight percent epoxy resin, the balance of the waste powder prime comprising filler, pigment and/or curing agent. A typical waste powder prime formulation which can be advantageously employed in the practice of the present invention will contain from about 35 to about 65 weight percent epoxy resin, from about 20 to about 40 weight percent filler, from about 3 to about 15 weight percent pigment and from about 0.1 to about 2.0 weight percent curing agent. Relatively-minor amounts, i.e., up to about 5 weight percent, of additional components not specified herein can be present in the waste powder prime. While the precise chemical composition of the epoxy resin present in waste powder prime is not known, it is believed that such resins generally comprise epoxy resins obtained by reaction of bisphenol A and/or bisphenol F with epichlorohydrin, i.e., bisphenol A-diglycidyl ethers and bisphenol F-diglycidyl ethers. The molecular weights of epoxy resins found in waste powder prime typically exceed about 900 and can range as high as about 5000. Epoxy values for these polymers range from about 450 to about 2500 equiv./100 g. Typical fillers present in waste powder prime include ground and precipitated calcium carbonate, ground silica, clays and talcs. Typical pigments include carbon black, titanium dioxide, and the like. Typical curing agents for the epoxy resins include polyamides, diethylenetriamine, methane diamine, m-phenylene diamine, diaminodiphenyl sulfone, tris (dimethyl amino methyl) phenol, dicyandiamide, $BF_3$-monoethylamine, nadicmethyl anhydride, and the like.

Waste powder prime which meets the foregoing specifications is commercially available under the tradename EPI-Pure P100 from Environmental Purification Industries, Toledo, Ohio. EPI-Pure P100 is preferred for use in the present invention.

The plastisol utilized in the formulation of the composition of the present invention contains finely divided resin particles which are dispersed in a plasticizer. Plastisol represents from about 35 to about 70 weight percent of the composition herein. The resins are well known and have been widely employed in plastisol compositions. Typical resins include polyvinyl chloride resins, polyvinyl acetate resins, copolymers of vinyl chloride with vinyl addition monomers such as vinyl acetate, the vinyl acetals, maleic esters, styrene, vinylidene chloride and acrylonitrile. Particularly preferred are polyvinyl chloride homopolymers. Blends of several different polyvinyl chloride resins may also be used and will be referred to as polyvinyl chloride resin, even though more than one resin may actually be present.

Plasticizers employed in the production of the plastisol include monomeric types selected to achieve desired characteristics such as proper gelation, fusion and flow properties. Examples of such monomeric plasticizers include monomeric esters of phthalic, benzoic, succinic, adipic, sebacic, talic, lauric, azelaic, caprylic, hexanoic, phosphoric, oleic, glutaric, trimellitic and stearic acids. Specific plasticizers include dioctyl phthalate, ethylene glycol dibenzoate, dioctyl succinate, dibutyl sebacate, dibenzyl azelate, didecyl glutarate and similar compounds. Other monomeric plasticizers include esters of 2,2,4-trimethyl-1,3-pentanediol, citric acid esters and n-ethyl toluenesultonamide.

Polymeric plasticizing agents can be used in conjunction with the monomeric plasticizers in order to achieve special characteristics such as performance, weathering resistance, and especially paintability. Polymer plasticizers useful in the present invention include the higher molecular weight polymeric acid esters (molecular weights greater than 1000). Examples of these polymeric plasticizers include esters of succinic, adipic, sebacic, talic, lauric, azelaic, caprylic, hexanoic, benzoic, phthalic, phosphoric, oleic, glutaric, trimellitic, and stearic acids, including mixtures or blends of these compounds. The polymeric plasticizers have low diffusion rates because of their higher molecular weights and also act to retard the migration of other components from the applied compositions. Additionally, low molecular weight chlorinated paraffinic oils and expoxidized soybean oil can be used as a co-plasticizer. Again, blends of several different plasticizers may be used, but will be referred to simply as the plasticizer.

The preferred plasticizers of the present invention are the monomeric esters of phthalic acid.

An optional, but preferred, component of the composition of the present invention is a thermoplastic polymeric resin which is capable of softening and flowing at application temperatures. Resins of this nature are commonly referred to as hot applied resins. The resins are characterized by their ability to set to a solid material by cooling rather than by solvent evaporation or chemical reaction. Thus, the resins are reduced to a soft or molten state by increasing temperature. Most of these resins progressively soften over a wide temperature rage, though some may actually have very narrow melting ranges and become a true liquid. Each type of resin is useful herein and is referred to as a hot applied resin. Typical resins are solid or semi-solid pastes at room temperature with softening temperatures of about 93° C. to about 190° C. Examples of thermoplastic polymeric resins include natural rubbers, synthetic rubbers, polyethylenes, polyamides, polyvinyl butyrals, polyvinyl acetates, cellulose derivatives, polyesters, polymethyl methacrylates and ethacrylates, polyvinyl ethers and polyurethanes. Specific examples of such thermoplastic resins include nitrile rubber, styrene-butadiene rubber, ethylene ethyl acrylate copolymers, vinyl acetate styrene butadiene block copolymers and butyl rubber.

Preferred thermoplastic resins are those polymers that show solubility and compatibility with polyvinyl chloride polymers such as nitrile rubber, styrene-butadiene rubbers, ethylene vinyl acetate copolymers, vinyl acetate ethylene copolymers, vinyl acetate copolymers, acrylonitrile copolymers, acrylonitrile butadiene copolymers, chlorinated ethylene vinyl acetate copolymers, polyepsilon caprolactones, polymethylmethacrylates and polybutylene terephthalates.

Adhesion promoter systems conventionally employed with plastisol compositions typically comprise an epoxy resin and a curing agent for the epoxy resin. Optionally, conventional adhesion promoter systems can further comprise additional components such as an unsaturated organosilane, an acrylic monomer, and/or an unsaturated acid or anhydride monomer.

Inclusion of the adhesion promoter system in plastisol compositions significantly increases the adhesion of the compositions to metal surfaces without adversely affecting the quality of the applied composition. Specifically, the composition's resistance to primer wash, paintability, viscosity stability, and the like, are not adversely affected by the adhesion promoter system.

Examples of epoxy resins employed in conventional adhesion promoter systems are those based on reaction products of bisphenol-A or bisphenol-F and epichlorohydrin with typical properties that include an epoxy value of 152–155 equiv./100 g and a molecular weight per epoxide group of 182–192. Other typical epoxy resins are phenol novolac, triphenylolmethane, and tetrabromo bisphenol-A. An example of an epoxy resin is a 40% adduct of carboxylic acrylonitrile butadiene elastomer and a liquid bisphenol-A diglycidyl ether type epoxy. That adduct has a molecular weight per epoxide group of 325–375. Curing of the epoxy or modified epoxy resin is accomplished by reacting the resin with an appropriate curing agent. Typical curing agents include polyamides, diethylenetriamine, methane diamine, m-phenylene diamine, diaminodiphenyl sulfone, tri (dimethyl amino methyl) phenol, dicyandiamide, $BF_3$-monoethyl amine and nadicmethyl anhydride.

Optional components of the composition of the invention comprise fillers, pigments, wetting agents, tackifiers, rheological additives, extenders, heat stabilizers, solvents, water-absorbing substances, waxes and mixtures of any two or more of the foregoing. Fillers include ground and precipitated calcium carbonate, ground silica, clays and talcs. Pigments include carbon black, titanium dioxide, and the like. Wetting agents include anionic, cationic, nonionic and amphoteric surfactants. Tackifiers include polyvinyl acetate. Rheological additives include precipitated calcium carbonates-and silica. Extenders include ground calcium carbonates. Heat stabilizers include lead and barium-cadmium-zinc systems. Solvents include napththa. Water absorbing substances include calcium oxide. Waxes include amorphous waxes, carnauba waxes, castor oil wax and various synthetic waxes. The optional component(s) represent from about 0 to about 50 weight percent of the composition of this invention.

Typically, the Brookfield viscosity of the composition will range from about 1,000 to about 10,000 poise and the press flow viscosity of the composition (0.125 inches/40 psi/20 g) will range from about 20 to about 300 sec.

Compositions of the invention with the immediately aforedescribed qualities can comprise from about 20 to about 35 weight percent of finely divided polymeric resin, from about 15 to about 35 weight percent of plasticizer, from about 0 to about 25 weight percent of thermoplastic polymeric resin, and from about 3 to about 15 weight percent of an adhesion promotion system comprising waste powder prime comprising from about 30 to about 70 weight percent epoxy resin, the balance of the waste powder prime comprising filler, pigment and/or curing agent. A preferred composition comprises from about 20 to about 30 weight percent of polyvinyl chloride resin, from about 15 to about 30 weight percent of plasticizer, from about 5 to about 20 weight percent of thermoplastic polymeric resin, from about 5 to about 13 weight percent of the aforedescribed adhesion promoter system, and the balance comprising one or more optional components selected from the group consisting of fillers, pigments, wetting agents, tackifiers, rheological additives, extenders, heat stabilizers, solvents, water-absorbing substances, waxes and mixtures of one or more thereof.

A particularly preferred composition in terms of performance and cost considerations comprises from about 25 to about 30 weight percent of polyvinyl chloride resin, from about 22 to about 30 weight percent of plasticizer, from about 10 to about 15 weight percent of thermoplastic polymeric resin, from about 5 to about 11 weight percent of the aforedescribed adhesion promoter system, from about 15 to about 20 weight percent of filler, from about 0 to about 8 weight percent solvent, and from about 1 to about 4 weight percent of heat stabilizer.

The compositions of the invention are made by
(a) mixing finely divided polymeric resin particles and plasticizer to provide a plastisol;
(b) adding (where desired) one or more thermoplastic resins, fillers, pigments, curing agents, wetting agents, tackifiers, rheological additives, extenders, stabilizers, solvents, water-absorbing substances, waxes, and mixtures thereof, to the plastisol; and
(c) adding an adhesion promoter system to the plastisol, said adhesion promoter system comprising waste powder prime comprising from about 30 to about 70 weight percent epoxy resin, the balance of the waste powder prime comprising filler, pigment and/or curing agent. The adhesion promoter system can optionally contain epoxy resin added separately from the waste powder prime, preferably in an amount not exceeding 50, more preferably not exceeding 25, weight percent, based on the weight of the adhesion promoter system. Furthermore, the adhesion promoter system can optionally contain other components, for example, an unsaturated organosilane, an acrylic monomer, and/or an unsaturated acid or anhydride monomer.

In general, in the formulation of the compositions of the present invention, the liquid components are combined first, followed by addition of the solid/powder components. The mixing used to formulate the composition is preferably high shear mixing. Thus, the mixing is performed under high shear conditions such as that provided by a Z-Blade high shear mixer operated at 15 to 25 rpm.

The order of addition of components to the mixture is not particularly critical. Thus, e.g., step (b) above can be performed before, after or simultaneously with step (c) above.

Since waste powder prime utilized in accordance with the practice of the present invention contains filler, pigment and/or curing agent in addition to epoxy resin, it is important for the formulator to take into consideration the presence of these components when formulating the composition of the present invention. For example, due to the presence of components other than epoxy resin in waste powder prime, the amount of waste powder prime added by the formulator will exceed the amount of epoxy resin being replaced in order to ensure that the amount of epoxy resin in said waste powder prime is approximately equal to the amount of epoxy resin being replaced. In other words, the weight ratio of epoxy resin present in the waste powder prime to the replaced epoxy resin is about 1:1. Similarly, it may be desirable or necessary to adjust the amount of filler, pigment and/or curing agent separately added by the formulator to the component mixture to account for the presence of these components in waste powder prime. The viscosity of the composition of this invention can be adjusted by the formulator to provide a composition of any desired consistency, i.e., sprayable, paintable, thumbgrade, etc., by diluting with suitable liquids, e.g., plasticizer, solvents, and the like. The foregoing adjustments are well within the purview of those skilled in the art.

The compositions of the invention act as a structural adhesive and a sealant in the assembly of structures such as automotive bodies, machinery, appliances, and the like. Thus, the compositions may be used in the body area of an automotive assembly to bond various steel components such as hoods and roof panels. The compositions can bond to a wide variety of metal surfaces such as cold-rolled steel, galvanized steel, galvaneal, and the like. Additionally, the compositions are used in the body shop area where certain components which demand greater structural bonds as obtained by welding require a sealant to seal welded joints. The compositions are heated from about 165 to about 200° C., preferably from about 170 to about 180° C., and applied in any convenient manner, such as pumping, troweling, flowing, brushing or spraying. The compositions are thermally stable so that they can be heated and drawn from a pumping operation for prolonged periods. Upon cooling, the compositions harden to a state with an initial degree of adhesion which is adequate for the intended purpose.

The assembled automotive body component or body shell is next prepared for painting. Typically this involves phosphate cleaning, washing, immersing the body shell in a primer bath, applying an electric charge to effect electrodeposition of the primer to the body shell, and removing the primed body shell from the bath. The compositions originally applied as adhesives and sealants remain intact. That is, they are not washed out onto adjoining surface areas of the body shell.

Subsequent to the priming step, if one is used, and prior to an oven bake, the body shell is top coated with a paint and oven baked to a totally cured state by plastisol fusion of the sealer and also the top coat paint. The fusion temperature is well above the aforementioned application temperature. The applied compositions of the invention are also able to withstand these operations without causing cosmetic-type problems such as discoloration, tackiness, cracking, etc.

The following examples illustrate the practice of the present invention.

EXAMPLE 1 AND COMPARATIVE EXAMPLES A AND B

An adhesive containing waste powder prime as a component of the adhesion promoter system thereof was formulated (Example 1) and compared to two standard adhesives (Comparative Examples A and B) containing no waste powder prime. The compositions of Example 1 and Comparative Examples A and B are as follows:

| Component | Example 1 (parts) | Comparative Example A (parts) | Comparative Example B (parts) |
| --- | --- | --- | --- |
| Nitrile Rubber (1) | 0 | 200 | 0 |
| Styrene-Butadiene Rubber (2) | 200 | 0 | 200 |
| Calcium Carbonate (3) | 300 | 500 | 500 |
| Carbon Black(4) | 10 | 10 | 10 |
| Polvinyl Chloride Resin (5) | 500 | 500 | 500 |
| Diisodecyl Phthalate (6) | 400 | 400 | 400 |
| Dicyanamide (7) | 100 | 100 | 100 |
| Calcium Oxide (8) | 25 | 25 | 25 |
| Epoxy Resin (9) | 219 | 438 | 438 |
| Aluminum Trihydrate (10) | 56 | 56 | 56 |
| Substituted Urea (11) | 6 | 6 | 6 |
| Diisononyl Phthalate (12) | 40 | 40 | 40 |
| Calcium Carbonate (13) | 185 | 160 | 160 |
| Zinc Oxide (14) | 6 | 6 | 6 |
| Azo Dicarbamide (15) | 6 | 6 | 6 |
| Waste Powder Prime (16) | 438 | 0 | 0 |

(1) 917-69 Rubberbase available from Goodyear
(2) 917-94 Rubberbase available from Ameripol Synpol
(3) ULTRAFLEX available from Specialty Mineral
(4) RAVEN 22 available from Columbian Chemical
(5) F28 available from Formosa
(6) DIDP available from Exxon
(7) Dicyanamide available from Air Products
(8) Calcium oxide available from Mississippi Lime
(9) DER 331 (Bisphenol A-diglycidyl ether) available from Dow Chemical
(10) DICY CG 1200 available from J M Huber
(11)AMNICURE UR2T available from Air Products
(12) Diisononyl Phthalate available from Exxon
(13)W4 available from J M Huber
(14) Zinc Oxide available from U.S. Zinc
(15) UNICELL D200 available from Dong Jing
(16) EB1-PURE P100 available from Environmental Purification Industries The viscosity, shear adhesion and volume expansion of the adhesives of Example 1 and Comparative Examples A and B were evaluated as follows:

Viscosity Test

Press flow viscosity was measured using GM 9021 P (orifice of 0.125 inches, pressure of 40 PSI and weight of 20 g).

Shear Adhesion Test

Measured using ASTM D1002-94. Bond lines of 0.005 inches and 0.021 inches were employed. Three samples of each example were tested at each of the two different bond line values.

Volume Expansion Test

Measured using GM 9037P.

EZ66 Adhesion Test

Adhesion to EZ66 (electrogalvanized steel) was measured using GM 2199M.

The results of these tests are as follows:

TABLE I

| Test | Example 1 | Comparative Example A | Comparative Example B |
| --- | --- | --- | --- |
| VISCOSITY (0.125/40 PSI/20 g) | 103.7 sec | 250.4 sec | 83.0 sec |
| SHEAR ADHESION 0.005=~ | 547 PSI | 602 PSI | 532 PSI |
| SHEAR ADHESION 0.005=~ | 607 PSI | 524 PSI | 575 PSI |
| SHEAR ADHESION 0.005=~ | 592 PSI | 484 PSI | 596 PSI |
| SHEAR ADHESION 0.021 | 804 PSI | 586 PSI | 789 PSI |
| SHEAR ADHESION 0.021 | 732 PSI | 702 PSI | 669 PSI |

TABLE I-continued

| Test | Example 1 | Comparative Example A | Comparative Example B |
|---|---|---|---|
| SHEAR ADHESION 0.021 | 711 PSI | 774 PSI | 694 PSI |
| VOLUME EXPANSION | 31% | 30% | 31% |
| ADHESION, EZ66 30' @ 177° C. | 100% COHESIVE | 100% COHESIVE | 100% COHESIVE |

It can be seen that Example 1 exhibited similar performance characteristics compared to Comparative Examples A and B, particularly with respect to Comparative Example B (which, like Example 1, was formulated with styrene-butadiene rubber as the thermoplastic resin component). Accordingly, waste powder prime has been demonstrated to be an effective substitute for epoxy resin in conventional adhesion promoter systems.

EXAMPLE 2 AND COMPARATIVE EXAMPLE C

A paintable body shop sealer containing waste powder prime as a component of the adhesion promoter system thereof was formulated (Example 2) and compared to a standard sealer containing no waste powder prime (Comparative Example C), as follows:

| Component | Example 2 (parts) | Comparative Example C (parts) |
|---|---|---|
| Polyvinyl acetate (1) | 132 | 132 |
| Nitrile Rubber (2) | 627 | 627 |
| Nitrile Rubber (3) | 313 | 313.5 |
| Calcium Carbonate (4) | 0 | 55 |
| Calcium Oxide (5) | 27.5 | 27.5 |
| Carbon Black (6) | 0.8 | 0.8 |
| Substituted Urea (7) | 2 | 2 |
| Dicyanamide (8) | 18.7 | 18.7 |
| Linear Phthalate (9) | 524.5 | 489.5 |
| Polyvinyl Chloride (10) | 330 | 330 |
| Epoxy Resin (11) | 83 | 166 |
| Zinc Dimethacrylate (12) | 9.5 | 9.5 |
| Peroxide Catalyst (13) | 1.5 | 1.5 |
| Calcium Carbonate (14) | 384 | 412.5 |
| Odorless Mineral Spirits (15) | 60 | 50 |
| Waste Powder Prime (16) | 166 | 0 |

(1) VMCH BASE 917-11 available from Union Carbide
(2) 92705 - Rubber Base available from Goodyear
(3) 927-10 1287 Rubber Base available from Goodyear
(4) W4 available from J M Huber
(5) Calcium Oxide available from Mississippi Lime
(6) Raven 22 available from Columbian Chemical
(7) Omnicure 52 available from Omnicron
(8) Amicur C6-1200 available from Air Products.
(9) Jayflex L9P available from Exxon
(10) F28 available from Formosa
(11) DER 331 (Bisphenol A-diglycidyl ether) available from Dow Chemical
(12) SR 708 available from Sartomer
(13) DICUP 500-40C available from Hercules
(14) Ultrapflex available from Specialty Minerals
(15) OMS available from Exxon
(16) EPI-PURE P100 available from Environmental Purification Industries The viscosity and shear adhesion of the sealers of Example 2 and Comparative Example C were evaluated, the results of which are as follows:

TABLE II

| Test | Example 2 | Comparative Example C |
|---|---|---|
| VISCOSITY (0.125 inches/40 PSI/20 g.) | 187.2 sec | 183.0 sec |
| ADHESION EZ66 30' @ 163° C. | Good | Good |
| Paintability | Good | Good |

It can be seen that Example 2 exhibited similar performance characteristics compared to Comparative Example C. Accordingly, waste powder prime has been demonstrated to be an effective substitute for epoxy resin in conventional adhesion promoter systems.

What is claimed is:

1. A composition useful as an adhesive or sealant in an industrial manufacturing process, containing:
   plastisol;
   adhesion promoter system comprising epoxy resin; and
   optional component(s) selected from the group consisting of fillers, pigments, wetting agents, tackifiers, rheological additives, extenders, heat stabilizers, solvents, water-absorbing substances, waxes, and mixtures thereof,
   wherein the improvement comprises replacing all or part of said epoxy resin in said adhesion promoter system with waste powder prime comprising from about 30 to about 70 weight percent epoxy resin, the balance of the waste powder prime comprising filler, pigment and/or curing agent, wherein the weight ratio of replaced epoxy resin to epoxy resin present in said waste powder prime is about 1:1.

2. The composition of claim 1 wherein epoxy resin in said waste powder prime comprises bisphenol A-diglycidyl ethers or bisphenol F-diglycidyl ethers.

3. The composition of claim 1 further containing at least one thermoplastic resin.

4. The composition of claim 3 wherein the thermoplastic resin is selected from the group consisting of natural rubbers, synthetic rubbers, polyethylenes, polyamides, polyvinyl butyrals, polyvinyl acetates, cellulose derivatives, polyesters, polymethylmethacrylates and ethacrylates, polyvinyl ethers and polyurethanes.

5. The composition of claim 3 wherein the thermoplastic resin is synthetic rubber.

6. The composition of claim 1 wherein the plastisol comprises a polymeric resin selected from the group consisting of poly(vinyl chloride), poly(vinyl acetate) and copolymers of vinyl chloride and vinyl acetate.

7. The composition of claim 1 wherein the epoxy resin in said adhesion promoter system is comprised of a substance selected from the group consisting of bisphenol A-diglycidyl ethers, bisphenol F-diglycidyl ethers, phenol novolac, triphenylolmethane, tetrabromo bisphenol-A, adducts of carboxylic acrylonitrile butadiene elastomer and bisphenol A-diglycidyl ethers, and mixtures thereof.

8. The composition of claim 1 wherein the plastisol represents from about 35 to about 70 weight percent of the composition.

9. The composition of claim 1 wherein the adhesion promoter system represents from about 3 to about 15 weight percent of the composition.

10. The composition of claim 1 wherein the optional component(s) represent from about 0 to about 50 weight percent of the composition.

11. The composition of claim 1 wherein the replaced epoxy resin is a bisphenol-A-diglycidyl ether epoxy resin and the epoxy resin in said waste powder prime is a bisphenol-A diglycidyl ether epoxy resin.

12. A composition comprising:

plastisol;

optional component(s) selected from the group consisting of thermoplastic resins, fillers, pigments, curing agents, wetting agents, tackifiers, rheological additives, extenders, stabilizers, solvents, water-absorbing substances, waxes and mixtures thereof; and an adhesion promoter system comprising waste powder prime comprising from about 30 to about 70 weight percent epoxy resin, the balance of the waste powder prime comprising filler, pigment and/or curing agent.

13. The composition of claim 12 wherein the plastisol comprises poly(vinyl chloride).

14. The composition of claim 12 wherein the epoxy resin in said waste powder prime comprises bisphenol A-diglycidyl ethers or bisphenol F-diglycidyl ethers.

15. The composition of claim 12 wherein the adhesion promoter system further comprises an epoxy resin selected from the group consisting of bisphenol A-diglycidyl ethers, bisphenol F-diglycidyl ethers, phenol novolac, triphenylolmethane, tetrabromo bisphenol-A, adducts of carboxylic acrylonitrile butadiene elastomers and bisphenol A-diglycidyl ethers, and mixtures thereof.

16. The composition of claim 12 possessing a press flow viscosity (0.125 inches/40 psi/20 g) ranging from about 20 to about 300 sec.

17. The composition of claim 12 exhibiting a shear strength ranging from about 100 to about 1000 psi.

18. A method of applying an adhesive or sealant to a substrate which comprises applying a composition to said substrate and heating the composition and substrate at a temperature ranging from about 165° C. to about 200° C., wherein said composition includes plastisol, adhesion promoter system comprising epoxy resin, and optional component(s) selected from the group consisting of fillers, pigments, wetting agents, tackifiers, rheological additives, extenders, heat stabilizers, solvents, water-absorbing substances, waxes and mixtures thereof, wherein all or part of said epoxy resin in said adhesion promoter system is replaced with waste powder prime comprising from about 30 weight percent to about 70 weight percent epoxy resin, the balance of the waste powder prime comprising filler, pigment and/or curing agent, wherein the weight ratio of replaced epoxy resin to epoxy resin present in said waste powder prime is about 1:1.

19. The method of claim 18 wherein the substrate comprises a metal assembly.

20. The method of claim 19 wherein the metal assembly is an automobile body or part.

21. The method of claim 19 wherein the metal assembly comprises cold-rolled steel, galvanized steel or galvaneal.

22. A method of applying an adhesive or sealant to a substrate which comprises applying a composition to said substrate and heating the composition and substrate at a temperature ranging from about 165° C. to about 200° C., wherein said composition includes plastisol, optional component(s) selected from the group consisting of thermoplastic resins, fillers, pigments, curing agents, wetting agents, tackifiers, rheological additives, extenders, stabilizers, solvents, water-absorbing substances, waxes and mixtures thereof, and an adhesion promoter system comprising waste powder prime comprising from about 30 to about 70 weight percent epoxy resin, the balance of the waste powder prime comprising filler, pigment and/or curing agent.

23. The method of claim 22 wherein the substrate comprises a metal assembly.

24. The method of claim 23 wherein the metal assembly is an automobile body or part.

25. The method of claim 23 wherein the metal assembly comprises cold-rolled steel, galvanized steel or galvaneal.

26. A method of making a composition, useful as an adhesive or sealant in an industrial manufacturing process, which comprises:

(a) mixing finely divided polymeric resin particles and plasticizer to provide a plastisol;

(b) combining at least one component selected from the group consisting of thermoplastic resins, fillers, pigments, curing agents, wetting agents, tackifiers, rheological additives, extenders, stabilizers, solvents, water-absorbing substances, waxes and mixtures thereof with the plastisol; and (c) combining an adhesion promoter system with the plastisol, said adhesion promoter system comprising waste powder prime comprising from about 30 to about 70 weight percent epoxy resin, the balance of the waste powder prime comprising filler, pigment and/or curing agent.

27. The method of claim 26 wherein step (b) precedes step (c).

28. The method of claim 26 wherein step (c) precedes step (b).

29. The method of claim 26 wherein step (b) and step (c) are performed simultaneously.

30. The method of claim 26 wherein the finely divided resin comprises poly(vinyl chloride).

31. The method of claim 26 wherein the epoxy resin in said waste powder prime comprises bisphenol-A diglycidyl ether, bisphenol-F diglycidyl ether or mixture thereof.

* * * * *